United States Patent
Xie

(10) Patent No.: US 9,784,603 B2
(45) Date of Patent: Oct. 10, 2017

(54) ELECTROMAGNETIC FLOWMETER EMPTY PIPE DETECTION SYSTEM

(71) Applicant: Invensys Systems, Inc., Foxboro, MA (US)

(72) Inventor: John Yuxiang Xie, Franklin, MA (US)

(73) Assignee: Invensys Systems, Inc., Foxboro, MA (US)

( * ) Notice: Subject to any disclaimer, the term of this patent is extended or adjusted under 35 U.S.C. 154(b) by 0 days.

(21) Appl. No.: 15/046,108

(22) Filed: Feb. 17, 2016

(65) Prior Publication Data

US 2017/0234708 A1    Aug. 17, 2017

(51) Int. Cl.
  *G01F 1/58*    (2006.01)
(52) U.S. Cl.
  CPC .................. *G01F 1/588* (2013.01)
(58) Field of Classification Search
  CPC .................. G01F 1/60; G01F 1/58
  USPC .......................... 73/861.12, 861.17
  See application file for complete search history.

(56) References Cited

U.S. PATENT DOCUMENTS

| | | | | |
|---|---|---|---|---|
| 5,327,787 A | * | 7/1994 | Kiene | G01F 1/002 73/215 |
| 5,426,984 A | * | 6/1995 | Rovner | G01F 1/60 73/861.12 |
| 5,895,864 A | * | 4/1999 | Wang | G01F 1/002 73/861.12 |
| 6,611,770 B1 | * | 8/2003 | O'Donnell | G01D 3/032 702/45 |
| 7,093,500 B2 | * | 8/2006 | Schulz | G01F 1/58 73/861.15 |
| 2014/0260663 A1 | | 9/2014 | Momose et al. | |

OTHER PUBLICATIONS

Extended European Search Report for 17155837.2, dated Jul. 20, 2017.

* cited by examiner

*Primary Examiner* — Jewel V Thompson
(74) *Attorney, Agent, or Firm* — Stephen Manetta; Ralph Graham

(57) ABSTRACT

A magnetic flowmeter includes a conduit and an electrical coil for generating a magnetic field extending through the conduit. A coil driver is configured to energize the coil and generate a periodically reversing magnetic field. Electrodes are arranged to detect voltages generated by flow of a conductive fluid through the magnetic field. A measurement system measures fluid flow rate using voltages detected by the electrodes. An empty conduit detector receives signals from the electrodes and determines whether or not the electrodes are immersed in the conductive fluid by analyzing the signals from the electrodes. The flowmeter optionally includes a low-flow verification system for distinguishing true low or zero flow rate measurements from measurements caused by the electrodes being exposed above the fluid level in the conduit by assessing whether or not EMF induced by magnetic flux change can be detected.

19 Claims, 5 Drawing Sheets

ELECTROMAGNETIC FLOWMETER EMPTY PIPE DETECTION SYSTEM

FIELD OF INVENTION

The present invention relates generally to electromagnetic flowmeters and more specifically to systems and methods for determining whether or not there is sufficient fluid in an electromagnetic flowmeter for accurate measurements.

BACKGROUND

Electromagnetic flowmeters are commonly used in various industries to measure the flow rate of conductive fluids flowing through pipelines or other conduits. In principle, electromagnetic flowmeters generate a magnetic field in a conduit extending through the meter. When conductive fluid flows through the conduit, the magnetic field induces a voltage difference between two locations in the fluid that are spaced apart in a direction transverse to the fluid flow and the magnetic field. The magnitude of this voltage difference is related to flow rate. Thus, the fluid flow rate can be measured by detecting and determining the amount of the voltage difference. The voltage difference is calibrated to the fluid velocity in the conduit. The fluid velocity can be used in combination with the cross sectional flow area to obtain a volumetric flow rate measurement. If the density of the fluid is known, the volumetric flow rate can be converted to a mass flow rate.

Sometimes the conduit might not be completely filled with fluid. If the fluid level drops below the level of the electrodes used to measure the voltage difference, a magnetic flowmeter cannot provide useful measurements of the fluid flow rate. Some conventional electromagnetic meters include so-called empty pipe detection systems, which typically detect whether or not the electrodes are immersed in the fluid. However, the present inventor has made certain improvements, which will be described in detail below.

SUMMARY

One aspect of the invention is a magnetic flowmeter including a conduit for conveying an electrically conductive fluid through the flowmeter. An electrical coil is arranged on the conduit to generate a magnetic field extending through the conduit. A coil driver is configured to apply alternating current to the electrical coil to energize the coil and periodically reverse polarity of the magnetic field. A pair of electrodes is on the conduit arranged to detect voltages generated by flow of the conductive fluid through the magnetic field. A measurement system is configured to measure a flow rate of the fluid through the conduit using the voltages detected by the electrodes. An empty conduit detector is arranged to receive signals from the electrodes and determine whether or not the electrodes are immersed in the conductive fluid. The empty conduit detector is configured to determine whether or not the electrodes are immersed in the conductive fluid by analyzing the signals from the electrodes.

Another aspect of the invention is a magnetic flowmeter including a conduit for conveying an electrically conductive fluid through the flowmeter. An electrical coil is arranged on the conduit to generate a magnetic field extending through the conduit. A coil driver is configured to apply alternating current to the electrical coil to energize the coil and periodically reverse polarity of the magnetic field. A pair of electrodes is on the conduit arranged to detect voltages generated by flow of the conductive fluid through the magnetic field. A measurement system is configured to measure a flow rate of the fluid through the conduit using the voltages detected by the electrodes. A low-flow verification system is configured to distinguish a condition in which a low or zero flow rate measurement is caused by a low rate of fluid flow through the conduit from a condition in which a low or zero flow rate measurement is caused by the electrodes being positioned above a level of the fluid in the conduit. The low-flow verification system is configured to assess whether or not EMF induced by magnetic flux change can be detected and to verify the low or zero flow rate measurement when EMF induced by magnetic flux change is detected.

Yet another aspect of the invention is a method of detecting an empty conduit condition in a magnetic flowmeter of the type comprising a conduit for conveying an electrically conductive fluid through the flowmeter; an electrical coil on the conduit and arranged to generate a magnetic field extending through the conduit; a coil driver configured to apply alternating current to the electrical coil to energize the coil and periodically reverse polarity of the magnetic field; a pair of electrodes on the conduit arranged to detect voltages generated by flow of the conductive fluid through the magnetic field; and a measurement system configured to measure a flow rate of the fluid through the conduit using the voltages detected by the electrodes. The method includes using at least one of the following to determine whether or not the electrodes are immersed in the fluid: a saturation level of the electrodes; a level of line noise in the signals from the electrodes; a level of flow induced voltage in the signals from the electrodes; a level of magnetic flux induced EMF in the signals from the electrodes; and combinations thereof.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
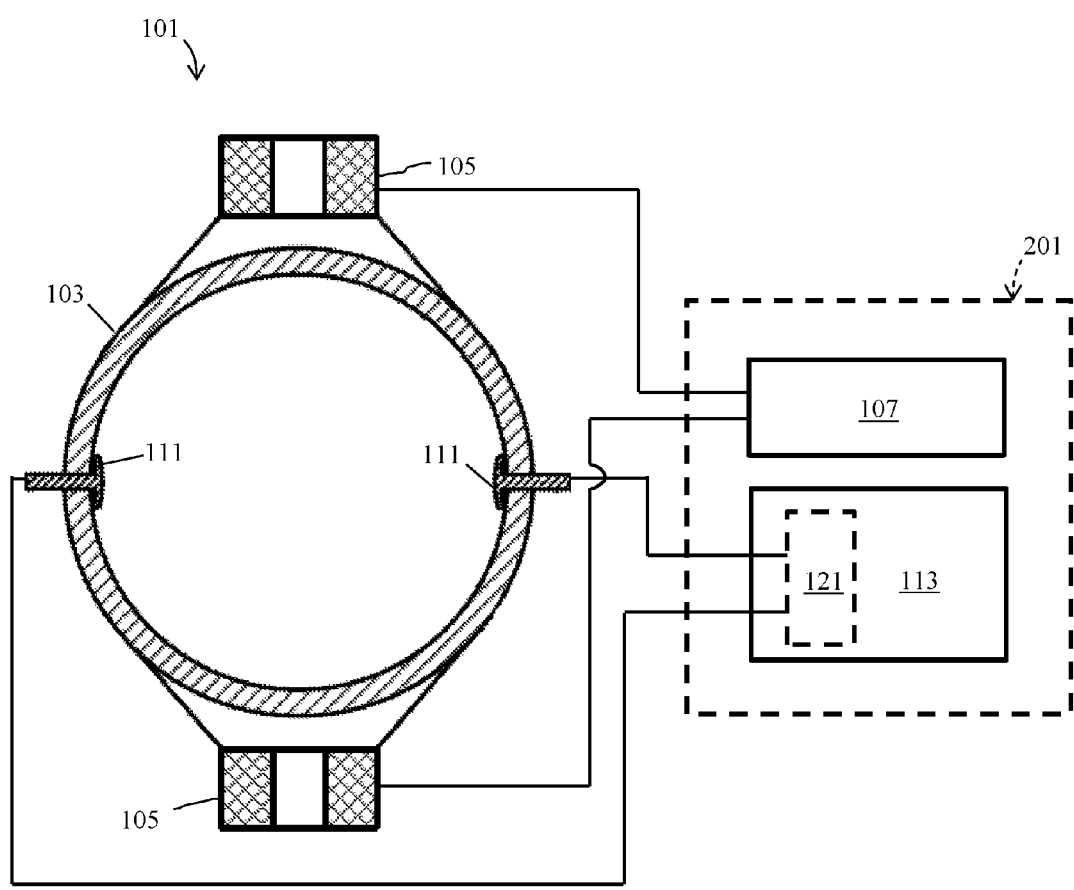
FIG. 1 is a schematic diagram of one embodiment of a magnetic flowmeter of the present invention.

Referring now to the drawings, first to FIG. 1, one embodiment of a magnetic flowmeter is generally designated 101. The flowmeter 101 has a conduit 103 that is configured to convey a fluid through the meter. The flowmeter 101 also has a system for generating a magnetic field that extends through the conduit 103. Various different systems can be used to generate the magnetic field. As illustrated in FIG. 1, the magnetic flowmeter 101 include an electrical coil 105 arranged on the conduit 103 to generate the magnetic field. Although a single electrical coil can be used, the magnetic flowmeter 101 in FIG. 1 has a pair of electrical coils 105 positioned on opposite sides of the conduit 103 so they can collectively generate the magnetic field. Those skilled in the art will recognize that this arrangement of electrical coils 105 is common in the art because it can facilitate more uniform magnetic field strength extending across the cross sectional flow area of the conduit 103. The magnetic flow meter 101 also has a coil driver 107 configured to energize the coils 105 and generate the magnetic field. Generally speaking, any voltage source that can drive current through the coils 105 can serve as the coil driver 107.

It is often desirable for the coil driver 107 to be configured to periodically reverse polarity of the magnetic field. Thus, the coil driver 107 is suitably a signal generator configured to generate an electrical signal having a periodic waveform. More suitably, the coil driver 107 is configured to generate a square wave and apply the square wave to the coils 105. The periodicity of the signal from the coil driver 107 results in periodic reversing of the polarity of the magnetic field in the conduit 103. This can help eliminate undesirable effects of stray magnetic fields (e.g., from the earth's magnetosphere or other equipment in the vicinity of the flowmeter 101) on the measurement. Moreover, using a square wave instead of a sinusoidal or other periodic waveform to energize the coils results in relatively long periods between the polarity reversals when the strength of the magnetic field in the conduit is relatively stable.

A pair of electrodes 111 are positioned on opposite sides of the conduit 103. The electrodes 111 extend through the wall of the conduit 103 a short distance into the flow area of the conduit. The electrodes 111 are positioned to detect the voltages generated when a conductive fluid flows through the conduit 103 and the magnetic field therein. As is known to those skilled in the art, a higher flow rate of fluid through the magnetic field in the conduit 103 will result in a larger electrical potential being generated within the conductive fluid, which is typically equipotentially bonded to the system ground or another reference voltage. Thus, the flowmeter has a measurement system 113 that is configured to measure a flow rate of the fluid through the conduit 103 using the voltages detected by the electrodes 111. The measurement system 113 is suitably uses conventional techniques to obtain flow rate measurements using the signals from the electrodes 111, which need not be described in further detail. The measurement system 113 and the coil driver 107 are suitably both included in a processor 201, which may be included in the electronics of a transmitter used for communication between the flowmeter 101 and other systems. It is understood that the processor 201 suitably includes other systems and components in addition to those illustrated in FIG. 1.

The magnetic flowmeter 101 has an empty conduit detector 121 arranged to receive signals from the electrodes 111 and determine whether or not the electrodes are immersed in the conductive fluid in the conduit 103. The magnetic flowmeter 101 will not function properly if the electrodes 111 are not immersed in the fluid. Whether or not the conduit 103 is completely empty is not that important compared to whether or not the electrodes 111 are exposed above the liquid level. The empty conduit detector 121 is suitably configured to determine whether or not the electrodes 111 are immersed in the conductive fluid by analyzing the signals from the electrodes. In contrast to empty conduit detectors that have been used in some other magnetic flowmeters, the empty conduit detector 121 does not require any sensors other than the same electrodes 111 used by the measurement system 113 to determine the fluid flow rate. The empty conduit detector 121 also requires no additional hardware, wiring, or other components. Instead, the empty conduit detector 121 can be piggybacked onto the same components used to implement the measurement system 113. In FIG. 1, the empty conduit detector 121 is illustrated as a component of the measurement system 113. For example, the empty conduit detector 121 can be implemented in a data acquisition board of the measurement system that receives the signals from the electrodes 111. However, it is understood that the empty conduit detector can be separate from the measurement system if desired.

The empty conduit detector 121 is suitably configured to determine whether or not the electrodes 111 are immersed in the conductive fluid using at least one of the following:

a saturation level of the electrodes;

a level of line noise in the signals from the electrodes;

a level of flow-induced voltage in the signals from the electrodes;

a level of magnetic flux induced EMF in the signals from the electrodes; and combinations thereof.

Figure 2:
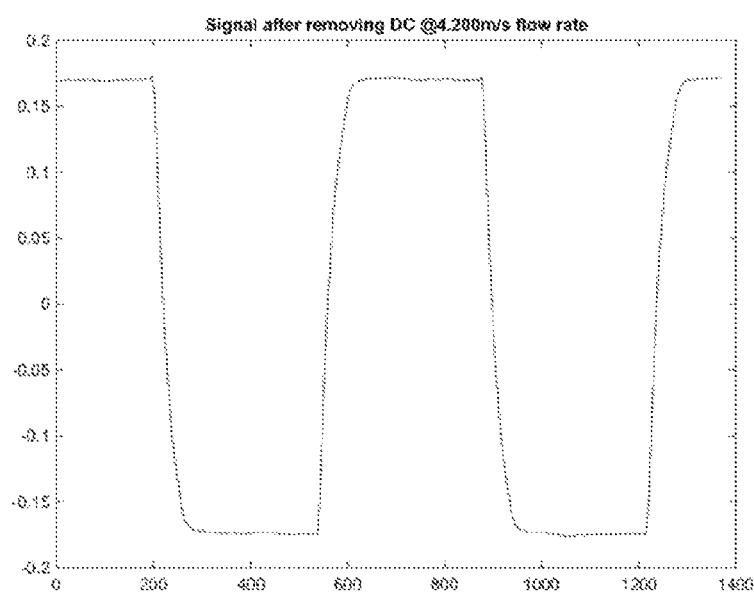
FIG. 2 shows one example of a signal from the electrodes of the magnetic flowmeter while the electrodes are immersed in fluid that is flowing through the meter.

When the electrodes 111 are immersed in the fluid and the fluid is grounded or connected to another suitable reference potential, the signals from the electrodes are generally not saturated. FIG. 2 shows the voltage difference between the electrodes 111 as a function of time during operation of the meter 101 with the coils 105 being driving by a square wave from the coil driver 107 and with a 4.2 m/s flow rate and fluid that immerses the electrodes. DC offset has been removed from the signal in FIG. 2. As illustrated, the electrodes 111 pick up a pronounced waveform generally resembling the square wave used by the coil driver 107 in this embodiment to energize the coils 105. In contrast, if the electrodes 111 are not immersed in the fluid, the signals from the electrodes may be saturated, meaning the signal registers as a horizontal flat line extending along the upper or lower limit of the signal range.

Figure 3:
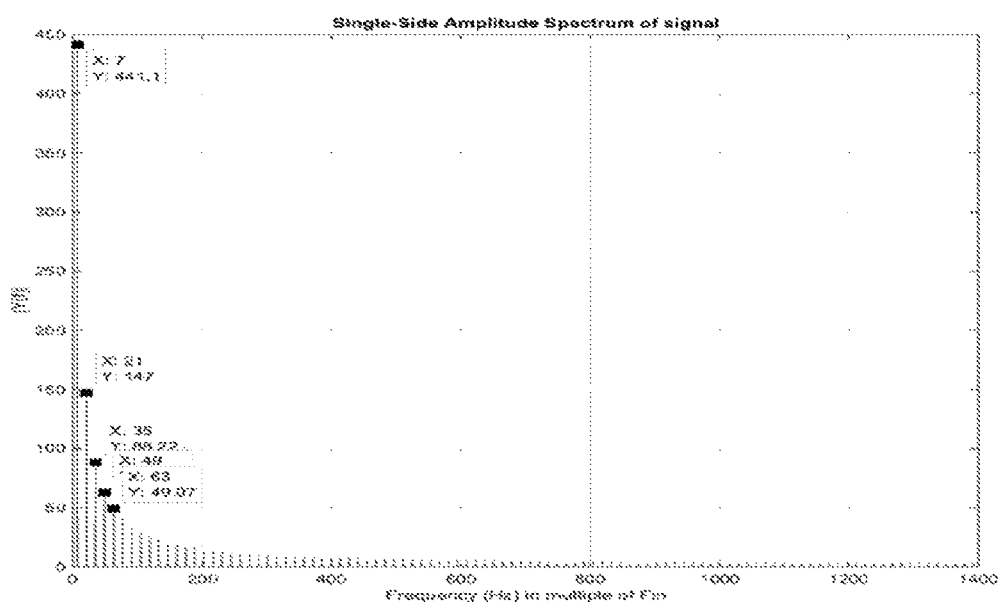
FIG. 3 shows the signal from FIG. 2 in the frequency domain.

FIG. 3 shows a single-side amplitude spectrum of the same signal that is illustrated in FIG. 2 in the frequency domain instead of the time domain. The fundamental frequency of the square wave used by the coil driver 107, which in this example has a fundamental frequency at 7 Hz, shows up as a large spike at 7 Hz in the frequency domain. Additional, smaller spikes, are also seen at higher harmonics of the fundamental frequency of the square wave used by the coil driver 107 to energize the coils 105. The presence of these spikes at the expected frequencies (based on the frequency content of the signal the coil driver 107 uses to energize the coils 105) is also indicative of an unsaturated signal and indicative of the electrodes 111 being immersed in the fluid. On the other hand, when the signals from the electrodes 111 are saturated, for example because they are not immersed in the fluid, the expected spikes associated with the frequency of the signal applied to the coils 105 will not be present in the frequency spectrum. Thus, the empty conduit detector 121 suitably determines the electrodes 111 are not immersed in the fluid upon detection of saturated signals from the electrodes. For example, the empty conduit detector 121 suitably determines the electrodes 111 are not immersed in the fluid upon a finding that the signals from the electrodes are saturated, as indicated by the signal remaining at the upper or lower limit of its range in time domain and/or absence of one or more expected spikes in the frequency spectrum of the signal when analyzed in the frequency domain.

Figure 4:
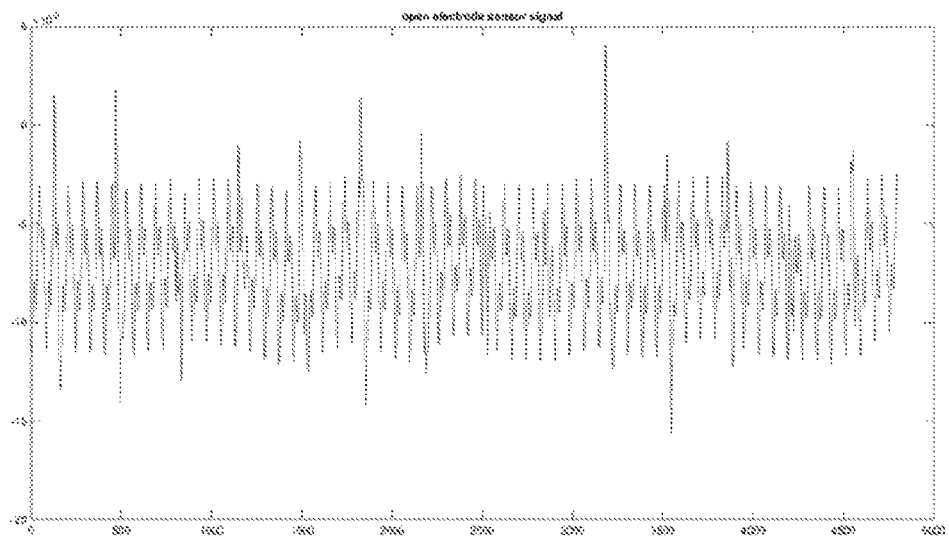
FIG. 4 shows an example of the signal from the electrodes of the magnetic meter during a time when the electrodes are not in contact with the fluid.
Figure 5:
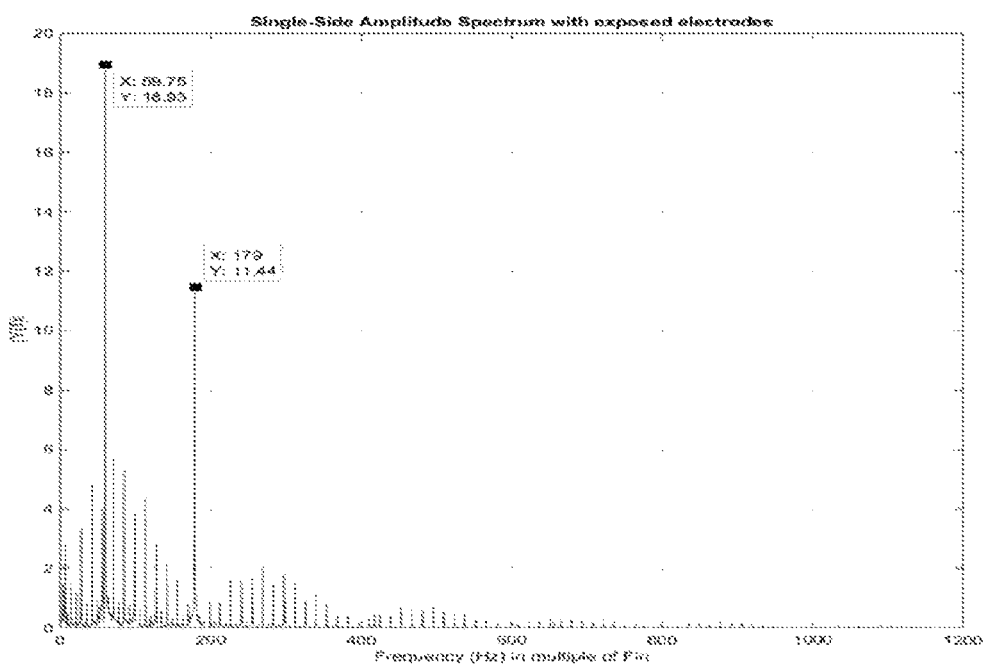
FIG. 5 shows the signal from FIG. 4 in the frequency domain.

In some cases the signals from the electrodes 111 are unsaturated even though the electrodes are not immersed in the fluid. FIG. 4 shows one example of a signal from the electrodes 111 during a time when the electrodes are not immersed in the fluid. The signal is not saturated and appears to be somewhat chaotic. The signal waveform in FIG. 4 bears little resemblance to the signal waveform in FIG. 2. There is also little to no resemblance of the waveform used by the coil driver 107 in the signals from the electrodes 111 in FIG. 4. Moreover, it has been determined that unsaturated signals from the electrodes 111 tend to be dominated by line noise when the electrodes 111 are not immersed in the fluid. This is because the high loading impedance of the exposed electrodes 111 makes the electrodes susceptible to the line noise from the power supply. This can be detected by analyzing the signal from the electrodes 111 in the frequency domain. FIG. 5 shows the signal from FIG. 4 in the frequency domain. There are two large spikes in the frequency spectrum. The first spike is at the fundamental frequency of the power supply (60 Hz in this case) and the other is at the third harmonic of that frequency. The frequency spectrum in FIG. 5 also does not include any large spikes corresponding to the frequencies associated with the frequency content of the signal used by the coil driver 107 to energize the coils, in sharp contrast to the frequency spectrum in FIG. 3. Accordingly, the empty conduit detector 121 is suitably configured to determine that the electrodes 111 are not immersed in the fluid upon determining that the signals from the electrodes contain excessive line noise. For instance, the empty conduit detector is suitably configured to determine the electrodes 111 are not properly immersed in the fluid when the frequency content of the signals from the electrodes has more energy at a frequency associated with the power supply than the amount of energy at any of the frequencies associated with the signal used by the coil driver 107 to energize the coils 105.

The signal in FIG. 2 (when the electrodes 111 are immersed and there is fluid flow) contains a strong amount of flow-induced voltage. This is indicated by the relatively large difference in voltage levels that occur in synchronicity with the reversals of the magnetic field by the coil driver 107 and coils 105. If the electrodes 111 were not immersed in the fluid, these voltage differences would not be present. Thus, the empty conduit detection system 121 can suitably use the presence of a large flow-induced difference in the voltage levels in the signals from the electrodes 111 and/or a large flow rate measurement output by the measurement system 113 as an indication that the electrodes are immersed in the fluid. However, the absence of a strong flow-induced voltage difference is not indicative of an empty conduit because it is also consistent with a low or zero fluid flow rate through the conduit 103. Thus, the empty conduit detector 121 cannot rely on the absence of a strong flow-induced voltage by itself as a reliable indicator of an empty conduit 103 or that the electrodes 111 are exposed above the fluid level.

Figure 6:
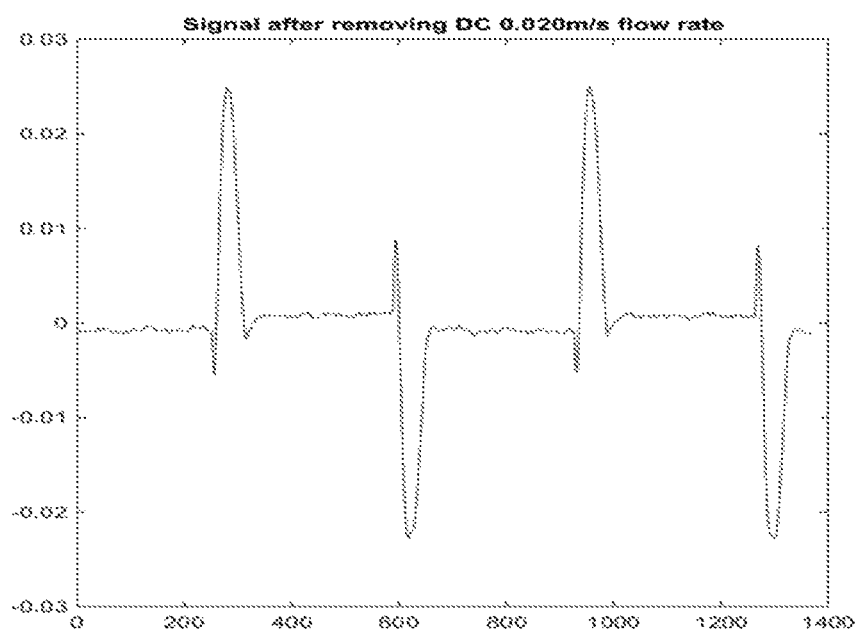
FIG. 6 shows one example of a signal from the electrodes of the magnetic meter during very low flow rate through the meter.
Figure 7:
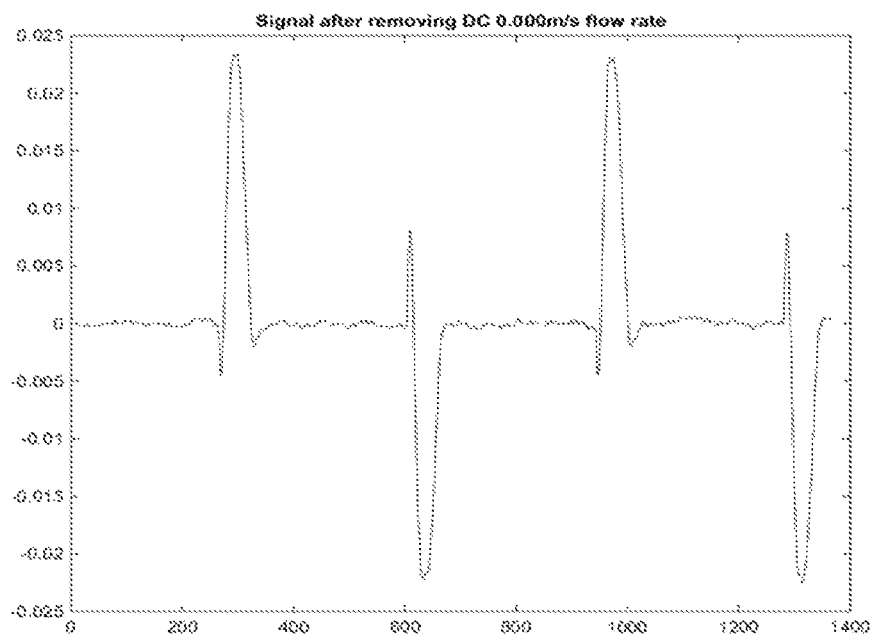
FIG. 7 shows an example of the signal from the electrodes of the magnetic meter during zero flow through the meter.

An indicator that can be used to distinguish an empty pipe condition from a zero or low flow rate condition is the presence of magnetic flux induced EMF. Referring to FIGS. 6 and 7, when the electrodes 111 are immersed in the fluid, the periodic reversal of the magnetic field will generate magnetic flux induced EMF that can be observed in the signal from the electrodes 111 even during periods of low or zero fluid flow. FIG. 6 shows the signal from the electrodes 111 during a time when the electrodes are immersed in the fluid and the fluid flow rate through the meter 101 is 0.02 m/s, which is a very low flow rate. FIG. 7 shows the signal from the electrodes 111 during a time when the electrodes are immersed in the fluid and the fluid flow rate is zero. DC offset has been removed from FIGS. 6 and 7. Note the vertical scale in FIGS. 6 and 7 is much different from the vertical scale in FIG. 2 to better illustrate small-scale features in the signals in FIGS. 6 and 7. The distinctive features of the waveforms apparent in FIGS. 6 and 7 would be almost too small to register if displayed on the same scale as FIG. 2. However, on the scale of FIGS. 6 and 7 magnetic flux induced EMF can be easily observed in the signal from the electrodes 111. Each time the polarity of the magnetic field is reversed there is a small spike preceding a much larger inverse spike in the signal from the electrodes 111. The small spike corresponds with a momentary increase in the magnetic field strength associated with draining of parasitic charges as the polarity of the magnetic field is reversed by the coil driver 107 in conjunction with the coils 105. The larger inverse spike is associated with EMF generated during the reversal of the magnetic field. As the magnetic field stabilizes the magnetic flux induced EMF decreases to zero until the next time the polarity of the magnetic field is reversed. Magnetic flux induced EMF is generated during higher flow rate of fluid in the same way and the small spike in FIGS. 6 and 7 can be seen even in FIG. 2 although it is very small on the scale of FIG. 2. However, in FIG. 2 the much larger inverse spike in the signals from the electrodes is masked by the flow-induced voltage difference generated by the flow of the fluid through the magnetic field.

Accordingly, the empty conduit detector 121 is suitably configured to determine the electrodes 111 are not immersed in the fluid upon a finding that magnetic flux induced EMF is not detectable in the signal from the electrodes under conditions during which the EMF should be detectable. For example, the empty conduit detector 121 is suitably configured to determine the electrodes 111 are not immersed in the fluid upon a finding that the relatively large inverse spike is not detectable even though the magnetic of the flow generated voltage difference at the measured flow rate is too small to mask the inverse spike. Likewise, the empty conduit detector 121 is suitably configured to determine the electrodes 111 are not immersed in the fluid upon a finding that the relatively smaller spike at the leading edge of the signal change associated with a magnetic field polarity reversal is absent.

In view of the foregoing, it is apparent that the empty conduit detector 121 is suitably configured to determine that the electrodes are not immersed upon finding any of the following conditions to be true:

the signals from the electrodes are saturated;
there is excessive line noise; and
EMF induced by magnetic flux change cannot be detected.

Figure 8:
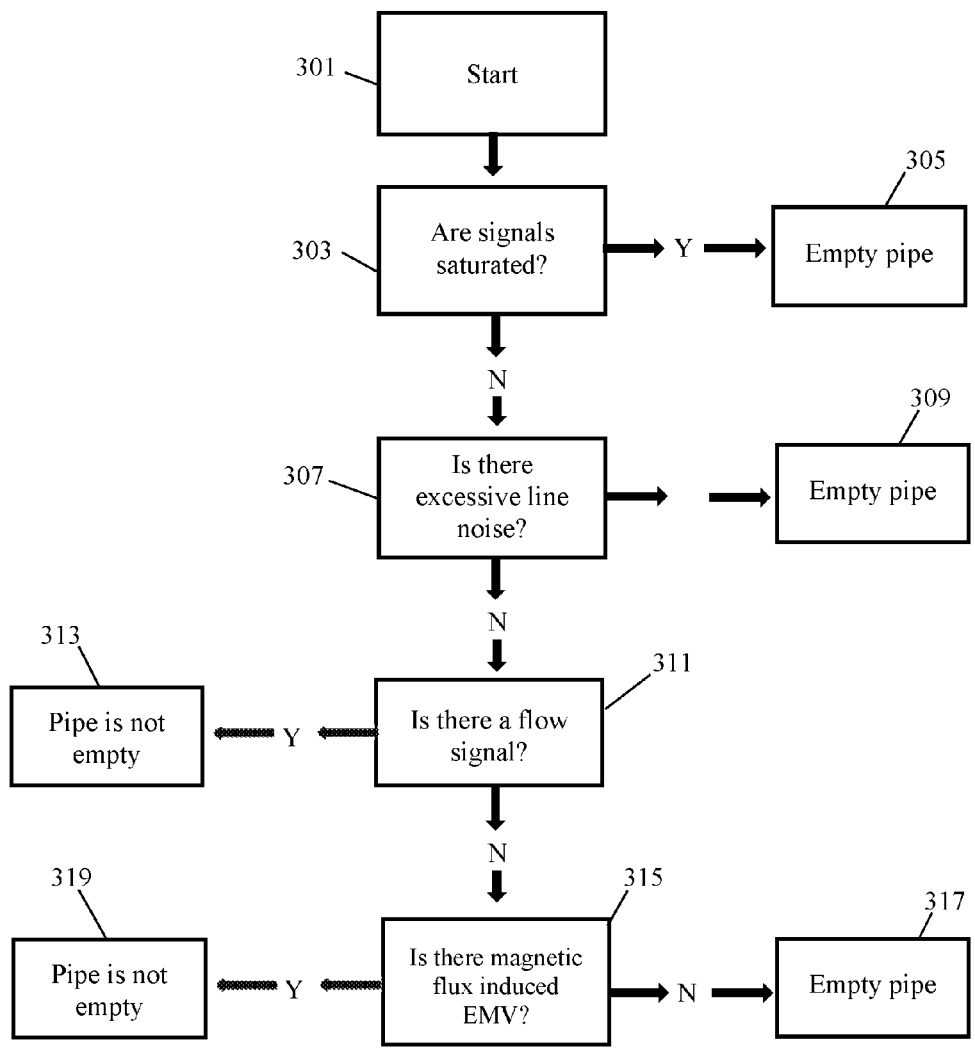
FIG. 8 is a flow diagram illustrating one embodiment of a method of determining whether or not the electrodes of the magnetic flowmeter in FIG. 1 are immersed in the fluid.

Various algorithms can be implemented by the empty conduit detector 121 to use the indicators described above to determine whether or not the electrodes 111 are immersed in the fluid using only the signals from the electrodes. Referring for example to FIG. 8, the magnetic flowmeter 101, and in particular the empty conduit detector 121 thereof, is suitably configured to:

assess whether or not the signals from the electrodes 111 are saturated (bock 303) and:
- determine that the electrodes 111 are not immersed when the signals are saturated (block 305); and
- go to the next step (block 307) when the signals are not saturated;

assess whether or not there is excessive line noise (block 307) and:
- determine the electrodes 111 are not immersed when the line noise is excessive (block 309); and
- go to the next step (block 311) when the line noise is not excessive;

assess whether or not a flow signal can be detected (block 311) and:
- determine that the electrodes 111 are immersed when the flow signal can be detected, the line noise is not excessive, and the signals from the electrodes are not saturated (block 313); and
- go to the next step (block 315) when the flow signal cannot be detected; and assess whether or not EMF induced by magnetic flux change can be detected (block 315) and:
- determine that the electrodes 111 are not immersed when EMF induced by magnetic flux change cannot be detected (block 317); and
- determine that the electrodes 111 are immersed when the EMF induced by magnetic flux change can be detected, the line noise is not excessive, and the signals from the electrodes are not saturated (block 319).

Regardless of the specific algorithm used by the empty conduit detector 121 to determine whether or not the electrodes 111 are immersed in the fluid, the magnetic flow meter 101 (e.g., the empty pipe detector thereof) is suitably configured to activate an alarm upon a determination that the electrodes 111 are not immersed in the fluid. Those skilled in the art will be familiar with various types of alarms that are suitable, including (without limitation) visible alarms, audible alarms, and various alarms and status or diagnostic messages output electronically by the flowmeter 101 (e.g., to a distributed control system). As part of, or in addition to an alarm the magnetic flow meter 101 is suitably configured to output a status message indicating whether or not the empty conduit detector 121 has determined the electrodes 111 are immersed in the fluid.

It is sometimes difficult to distinguish between a condition in which the electrodes 111 are not immersed in the fluid and a condition in which the electrodes are immersed in the fluid, but there is an absence of flow-induced voltage in the signals from the electrodes due to low or zero fluid flow rate. The empty conduit detector 121 can verify the relative absence of flow-induced voltage is due to low or zero fluid flow rate instead of exposed electrodes 111 by detecting the magnetic flux induced EMF. Thus, the empty conduit detector 121 can be considered a low-flow verification system that verifies a potentially anomalous low flow rate measurement derived by the measurement system 113 from the signal from the electrodes 111 is due to low fluid flow rate and not due to exposed electrodes 111.

One embodiment of a method of the present invention includes using at least one of the following to determine whether or not the electrodes 111 of the flowmeter 101 are immersed in fluid:
- a saturation level of the electrodes;
- a level of line noise in the signals from the electrodes;
- a level of flow induced voltage in the signals from the electrodes;
- a level of magnetic flux induced EMF in the signals from the electrodes; and
- combinations thereof.

For example, referring again to FIG. 8, the method suitably includes, after starting the empty conduit detector 121 (block 301):
- receiving signals from the electrodes 111 and assessing whether or not the signals from the electrodes are saturated (block 303), and:
  - determining that the electrodes are not immersed in the fluid when the signals are saturated (block 305); and
  - going to the next step (block 307) when the signals are not saturated;
- assessing whether or not there is excessive line noise in the signals from the electrodes 111 (block 307), and:
  - determining the electrodes are not immersed in the fluid when the line noise is excessive (block 309); and
  - going to the next step (block 311) when the line noise is not excessive;
- assessing whether or not a flow signal can be detected (block 311), and:
  - determining that the electrodes 111 are immersed when the flow signal can be detected, the line noise is not excessive, and the signals from the electrodes are not saturated (block 313); and
  - going to the next step (block 315) when the flow signal cannot be detected; and
- assessing whether or not EMF induced by magnetic flux change can be detected (block 315) and:
  - determining that the electrodes 111 are not immersed when EMF induced by magnetic flux change cannot be detected (block 317); and
  - determining that the electrodes are immersed when the EMF induced by magnetic flux change can be detected, the line noise is not excessive, and the signals from the electrodes are not saturated (block 319).

It is noted that the order of the steps in the method can be changed. Also, some of the steps of the method can be omitted if desired. Any one of the steps of using the saturation levels of the signals, the amount of line noise, the presence or absence of a flow signal, and the presence of magnetic flux induced EMF can be used in isolation or in combination with any number of the other steps to determine whether or not the electrodes of a magnetic flowmeter are immersed in the fluid.

The Abstract and summary are provided to help the reader quickly ascertain the nature of the technical disclosure. They are submitted with the understanding that they will not be used to interpret or limit the scope or meaning of the claims. The summary is provided to introduce a selection of concepts in simplified form that are further described in the Detailed Description. The summary is not intended to identify key features or essential features of the claimed subject matter, nor is it intended to be used as an aid in determining the claimed subject matter.

The signal illustrated in the Figures herein provide examples of certain patterns identified as being pertinent to the determination of whether or not the electrodes 111 are immersed in the fluid. It is understood that the specific range of voltages over which the patterns may be exhibited will depend on a number of circumstances including, without limitation, the specific model of flowmeter and the particular installation. The particular voltage levels illustrated in the examples provided herein are not to be construed as limiting.

Although described in connection with an exemplary computing system environment, embodiments of the aspects of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment.

Embodiments of the aspects of the invention may be described in the general context of data and/or processor-executable instructions, such as program modules, stored on one or more tangible, non-transitory storage media and executed by one or more processors or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments of the aspects of the invention may be implemented with processor-executable instructions. The processor-executable instructions may be organized into one or more processor-executable components or modules on a tangible processor readable storage medium. Aspects of the invention may be implemented with any number and organization of such components or modules. For example, aspects of the invention are not limited to the specific processor-executable instructions or the specific components or modules illustrated in the figures and described herein. Other embodiments of the aspects of the invention may include different processor-executable instructions or components having more or less functionality than illustrated and described herein.

The order of execution or performance of the operations in embodiments of the aspects of the invention illustrated and described herein is not essential, unless otherwise specified. That is, the operations may be performed in any order, unless otherwise specified, and embodiments of the aspects of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

When an apparatus is described herein as being "configured to" do a specified function, this means that the apparatus has an existing capability to do whatever is specified and includes, without limitation, an apparatus that performs that function automatically and also an apparatus that does not automatically perform that function but has an existing capability to perform that function when activated to do so without requiring any additional programming, firmware, or electrical components to support the specified function.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention is not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and methods without departing from the scope of aspects of the invention. In the preceding specification, various preferred embodiments have been described with reference to the accompanying drawings. It will, however, be evident that various modifications and changes may be made thereto, and additional embodiments may be implemented, without departing from the broader scope of the aspects of the invention as set forth in the claims that follow. The specification and drawings are accordingly to be regarded in an illustrative rather than restrictive sense.

In view of the above, it will be seen that several advantages of the aspects of the invention are achieved and other advantageous results attained.

What is claimed is:

1. A magnetic flowmeter comprising:
   a conduit for conveying an electrically conductive fluid through the flowmeter;
   an electrical coil on the conduit and arranged to generate a magnetic field extending through the conduit;
   a coil driver configured to apply alternating current to the electrical coil to energize the coil and periodically reverse polarity of the magnetic field;
   a pair of electrodes on the conduit arranged to detect voltages generated by flow of the conductive fluid through the magnetic field;
   a measurement system configured to measure a flow rate of the fluid through the conduit using the voltages detected by the electrodes; and
   an empty conduit detector arranged to receive signals from the electrodes and determine whether or not the electrodes are immersed in the conductive fluid, the empty conduit detector being configured to determine whether or not the electrodes are immersed in the conductive fluid by analyzing the signals from the electrodes,
   wherein the empty conduit detector is configured to determine whether or not the electrodes are immersed in the conductive fluid using at least one of the following: a saturation level of a difference signal from the electrodes; a level of line noise in the signals from the electrodes, a level of flow induced voltage in the signals from the electrodes; a level of magnetic flux induced EMF in the signals from the electrodes; and combinations thereof.

2. A magnetic flowmeter as set forth in claim 1 wherein the empty conduit detector is configured to determine whether or not the electrodes are immersed in the conductive fluid using the saturation level of the difference signal from the electrodes.

3. A magnetic flowmeter as set forth in claim 1 wherein the empty conduit detector is configured to determine whether or not the electrodes are immersed in the conductive fluid using the level of line noise in the signals from the electrodes.

4. A magnetic flowmeter as set forth in claim 1 wherein the empty conduit detector is configured to determine whether or not the electrodes are immersed in the conductive fluid using the level of flow induced EMF in the signals from the electrodes.

5. A magnetic flowmeter as set forth in claim 1 wherein the empty conduit detector is configured to determine whether or not the electrodes are immersed in the conductive fluid using the level of magnetic flux induced EMF in the signals from the electrodes.

6. A magnetic flowmeter as set forth in claim 1 wherein the empty conduit detector comprises a data acquisition board configured to determine whether or not the electrodes are immersed in the conductive fluid by analyzing the signals from the electrodes.

7. A magnetic flowmeter as set forth in claim 1 wherein the empty conduit detector does not use any sensors except the electrodes to determine whether or not the electrodes are immersed in the fluid.

8. A magnetic flowmeter as set forth in claim 1 wherein the empty conduit detector is configured to determine that the electrodes are not immersed upon finding any of the following conditions to be true:
   the signals from the electrodes are saturated;
   there is excessive line noise; and
   EMF induced by magnetic flux change cannot be detected.

9. A magnetic flowmeter as set forth in claim 1 wherein the empty conduit detector is configured to:
   (a) assess whether or not the difference signal from the electrodes is saturated and:
      (i) determine that the electrodes are not immersed when the difference signals are saturated; and
      (2) go to step (b) when the difference signal is not saturated;
   (b) assess whether or not there is excessive line noise and:
      (i) determine the electrodes are not immersed when the line noise is excessive; and
      (ii) go to step (c) when the line noise is not excessive;
   (c) assess whether or not a flow signal can be detected and:
      (i) determine that the electrodes are immersed when the flow signal can be detected, the line noise is not excessive, and the signals from the electrodes are not saturated; and
      (ii) go to step (d) when the flow signal cannot be detected; and
   (d) assess whether or not EMF induced by magnetic flux change can be detected and:
      (i) determine that the electrodes are not immersed when EMF induced by magnetic flux change cannot be detected; and
      (ii) determine that the electrodes are immersed when the EMF induced by magnetic flux change can be detected, the line noise is not excessive, and the signals from the electrodes are not saturated.

10. A magnetic flowmeter as set forth in claim 1 wherein the flowmeter is configured to activate an alarm when the empty conduit detector determines the electrodes are not immersed in the fluid.

11. A magnetic flowmeter as set forth in claim 1 wherein the flowmeter is configured to output a status message indicating whether or not the empty conduit detector has determined the electrodes are immersed in the fluid.

12. A magnetic flowmeter comprising:
   a conduit for conveying an electrically conductive fluid through the flowmeter;
   a electrical coil on the conduit and arranged to generate a magnetic field extending through the conduit;
   a coil driver configured to apply alternating current to the electrical coil to energize the coil and periodically reverse polarity of the magnetic field;
   a pair of electrodes on the conduit arranged to detect voltages generated by flow of the conductive fluid through the magnetic field;
   a measurement system configured to measure a flow rate of the fluid through the conduit using the voltages detected by the electrodes; and
   a low-flow verification system configured to distinguish a condition in which a low or zero flow rate measurement is caused by a low rate of fluid flow through the conduit from a condition in which a low or zero flow rate measurement is caused by the electrodes being positioned above a level of the fluid in the conduit, the low-flow verification system being configured to assess whether or not EMF induced by magnetic flux change can be detected and to verify the low or zero flow rate measurement when EMF induced by magnetic flux change is detected.

13. A magnetic flowmeter as set forth in claim 12 wherein the coil driver is configured to apply a square wave to the electrical coil and the low-flow verification system is configured to detect EMF induced by the magnetic flux change by analyzing a voltage signal from the electrodes.

14. A magnetic flowmeter as set forth in claim 13 wherein the low-flow verification system is configured to detect EMF induced by the magnetic flux change by detecting overshoots in the voltage signal.

15. A method of detecting an empty conduit condition in a magnetic flowmeter of the type comprising a conduit for conveying an electrically conductive fluid through the flowmeter; an electrical coil on the conduit and arranged to generate a magnetic field extending through the conduit; a coil driver configured to apply alternating current to the electrical coil to energize the coil and periodically reverse polarity of the magnetic field; a pair of electrodes on the conduit arranged to detect voltages generated by flow of the conductive fluid through the magnetic field; and a measurement system configured to measure a flow rate of the fluid through the conduit using the voltages detected by the electrodes, the method comprising using at least one of the following to determine whether or not the electrodes are immersed in the fluid:
   a saturation level of a difference signal from the electrodes;
   a level of line noise in the signals from the electrodes;

a level of flow induced voltage in the signals from the electrodes;

a level of magnetic flux induced EMF in the signals from the electrodes; and combinations thereof.

16. A method as set forth in claim 15 wherein the method comprises:
(a) receiving signals from the electrodes and assessing whether or not the signals from the electrodes are saturated, and:
  (i) determining that the electrodes are not immersed in the fluid when the signals are saturated; and
  (2) going to step (b) when the signals are not saturated;
(b) assessing whether or not there is excessive line noise in the signals from the electrodes, and:
  (i) determining the electrodes are not immersed in the fluid when the line noise is excessive; and
  (ii) going to step (c) when the line noise is not excessive;
(c) assessing whether or not a flow signal can be detected, and:
  (i) determining that the electrodes are immersed when the flow signal can be detected, the line noise is not excessive, and the signals from the electrodes are not saturated; and
  (ii) going to step (d) when the flow signal cannot be detected; and
(d) assessing whether or not EMF induced by magnetic flux change can be detected and:
  (i) determining that the electrodes are not immersed when EMF induced by magnetic flux change cannot be detected; and
  (ii) determining that the electrodes are immersed when the EMF induced by magnetic flux change can be detected, the line noise is not excessive, and the signals from the electrodes are not saturated.

17. A method as set forth in claim 16 wherein assessing whether or not there is excessive line noise in the signals from the electrodes comprises analyzing a power spectrum of the signals from the electrodes in the frequency domain.

18. A method as set forth in claim 16 wherein assessing whether or not the signals from the electrodes are saturated comprises analyzing the signals in the frequency domain to see if frequencies associated with the coil driver are present in the signals.

19. A method as set forth in claim 15 wherein the magnetic flowmeter comprises a data acquisition board configured to receive the signals from the electrodes and the steps of the method are executed by the data acquisition board.

* * * * *